CRYOGENIC ANALOG-TO-DIGITAL CONVERTER

Filed July 2, 1964 3 Sheets-Sheet 1

Charles J. Hughes
Matthew J. Campanella,
INVENTORS.
BY Harry M. Saragovitz
Edward J. Kelly
Herbert Berl
Alfred E. Smith

CRYOGENIC ANALOG-TO-DIGITAL CONVERTER

Charles J. Hughes
Matthew J. Campanella,
INVENTORS.
Harry M. Saragovitz
BY Edward J. Kelly
Herbert Berl
Alfred E. Smith June 20, 1967 C. J. HUGHES ETAL 3,327,303

CRYOGENIC ANALOG-TO-DIGITAL CONVERTER

Filed July 2, 1964 3 Sheets-Sheet 3

Charles J. Hughes
Matthew J. Campanella,
*INVENTORS.*
Harry M. Saragovitz
BY Edward J. Kelly
Herbert Bell
Alfred E. Smith United States Patent Office 3,327,303
Patented June 20, 1967

3,327,303

CRYOGENIC ANALOG-TO-DIGITAL CONVERTER

Charles J. Hughes, Moorestown, and Matthew J. Campanella, Cherry Hill, N.J., assignors to the United States of America as represented by the Secretary of the Army Filed July 2, 1964, Ser. No. 380,108
9 Claims. (Cl. 340—347)

ABSTRACT OF THE DISCLOSURE

A cryogenic analog to digital converter wherein each digit forming unit includes at least one cryogenic comparator. Each cryogenic comparator has three paralleled superconducting branches with one or more cryotrons in each branch, and the output circuit of each comparator is controlled by one of the superconducting branches. The converter has separate and distinct input and reset circuits. All cryogenic comparators in a given digit forming unit have series connected outputs connected to a single cryogenic load.

This invention relates to signal converters and more particularly to analog-to-digital converters employing cryogenic techniques.

There exists at the present time a need for an analog-to-digital converter capable of converting an input analog signal into a binary code with a very fast switching time. The device must be simple to manufacture, low in cost and should be contained in a very small volume.

This need has been satisfied by the present invention which employs cryogenic techniques. The device according to the invention is relatively simple to manufacture and the cost is practically independent of the number of binary digits required. Because the cryogenic circuit disclosed herein does not require gain at any of the cryogenic controls, very fast switching time is possible and is on the order of 1 nanosecond. Thus, through the use of cryogenics, high speed conversion is made practicable; the thousand or so comparators which are required for a 10 bit converter can be manufactured with relative ease, and at small cost. Also, approximately 6,000 cryogenic controls required for a 10 bit converter could be contained in a volume of 10 cubic inches, with power consumption less than 3 milliwatts, based on 0.5 $\mu$watts per switching action.

Accordingly, it is an object of the present invention to provide a cryogenic signal converter having a very fast switching time.

Another object is to provide a signal converter that is inexpensive to manufacture.

A still further object is to provide an analog-to-digital signal converter that is small in size.

Figure 1:
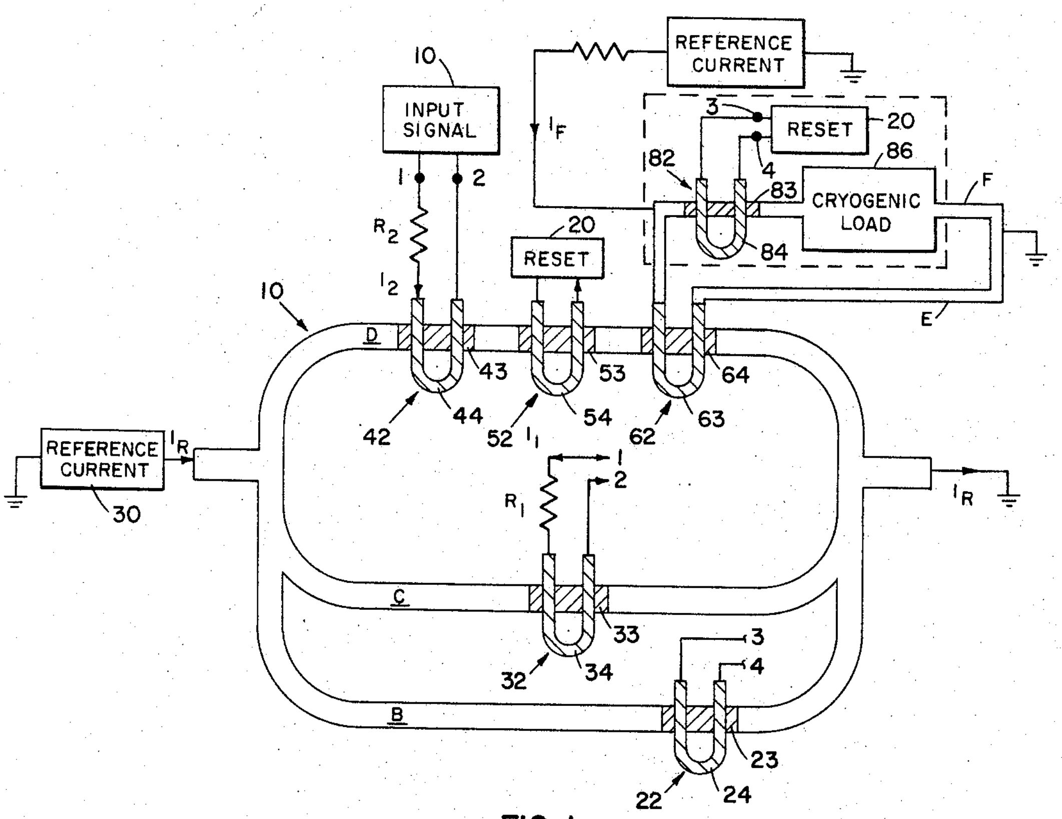
Figure 2:
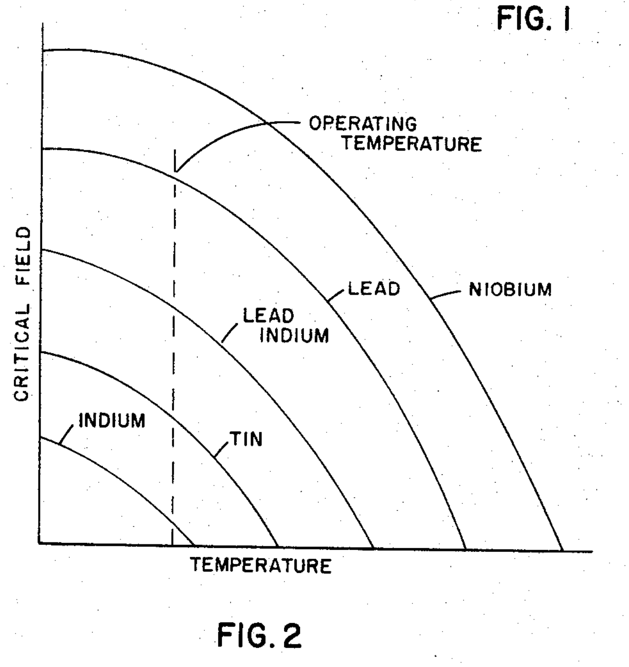
Figures 3, 4:
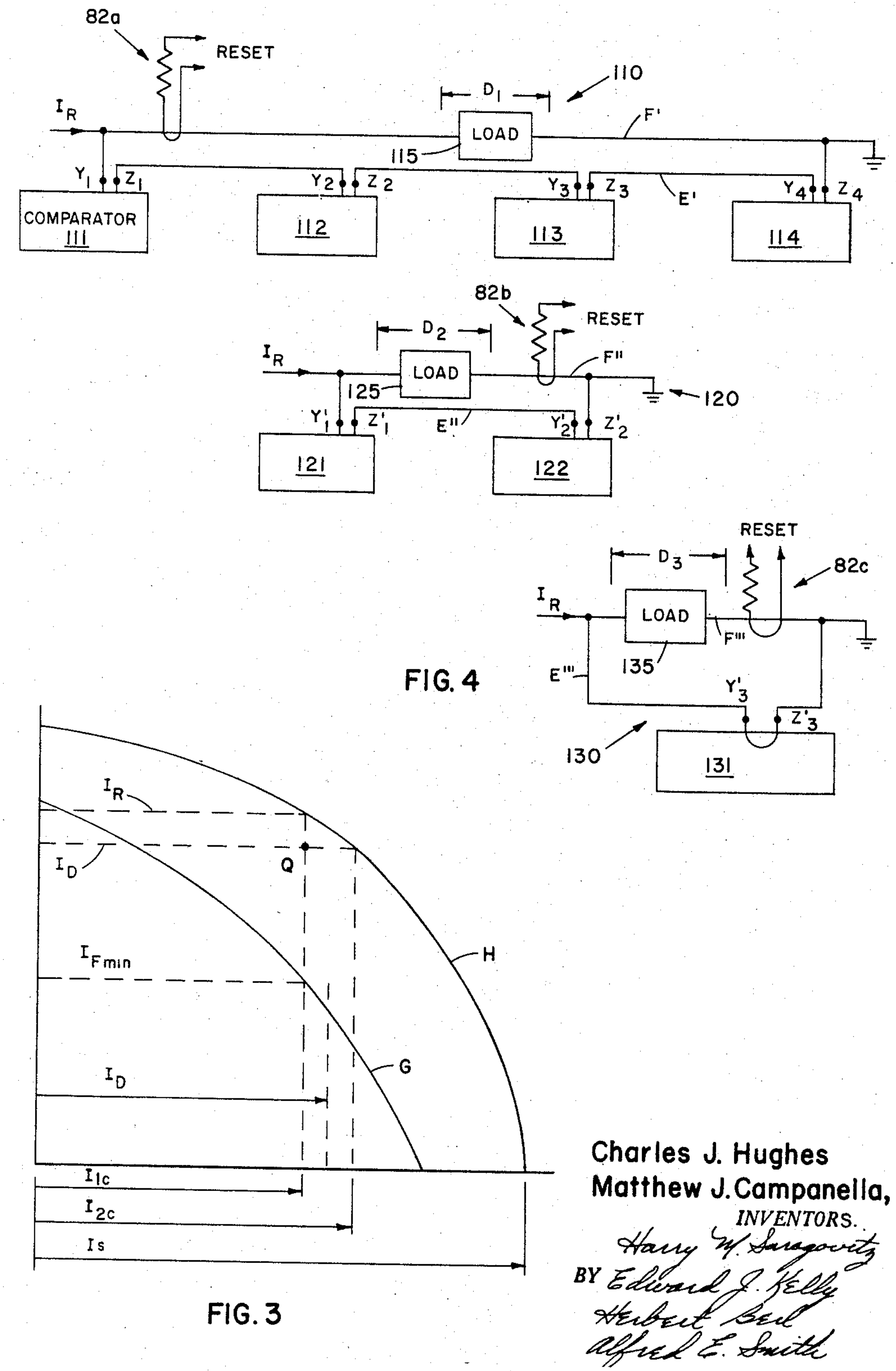
Figure 6:
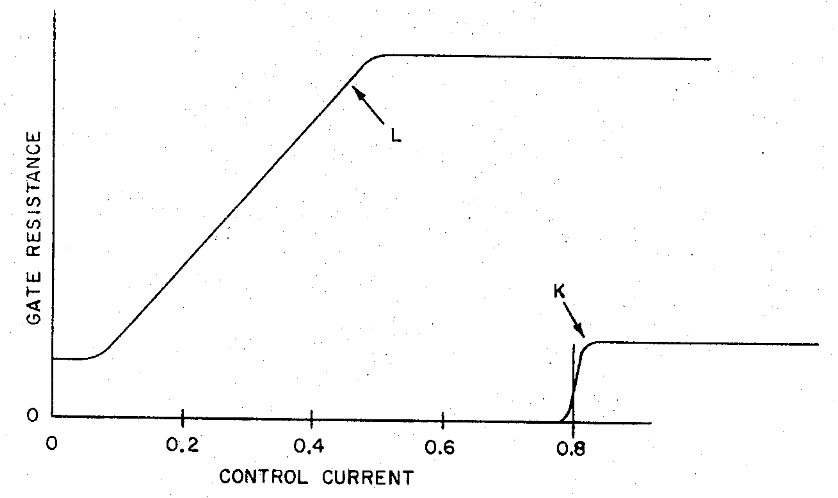

These and other objects and advantageous features of this invention may be more fully appreciated when considered in light of the following detailed description and drawings, in which;

FIGURE 1 is a diagrammatic illustration of a cryogenic comparator according to the invention, FIGURE 2 is a graph showing the relationship between the critical field and the temperature of various superconducting metals, FIGURE 3 is a graph showing the control characteristics of a comparator as illustrated in FIGURE 1, FIGURE 4 is a block diagram illustration of the connections of the comparators of FIGURE 1 to obtain a natural binary analog-to-digital converter, FIGURES *5a* and *5b* are diagrammatic views of thin film cryogenic controls (cryotrons) used to obtain the comparator of FIGURE 1, and FIGURE 6 is a graph illustrating the relationship between control current and gate resistance of thin film devices according to the invention.

The cryogenc comparator 10, shown in FIGURE 1, comprises a number of parallel superconducting branches B, C, and D. Each branch has at least one cryogenic control (cryotron) inserted therein. Branch B has a single cryotron 22 which includes a superconducting thin film gate element 23 and a superconducting thin film control element 24. Gate 23 may be formed from lead, and control 24 may be formed from niobium.

Branch C is similar to branch B in that it has a single cryotron 32 including a gate element 33 and control element 34. Branch D includes cryotrons 42, 52, and 62 having gate elements 43, 53, and 63 and control elements 44, 54, and 64. The gate and control elements of cryotrons 32, 42, and 52 may be chosen the same as for cryotron 22, i.e., lead and niobium and gate and control elements for cryotron 62, may be formed from tin and lead, respectively.

Also, any other combination of superconducting metals can be used provided that the critical field of controls 24, 34, 54, 64 and 84 lies above the critical field of their respective gates 23, 33, 43, 53, 63 and 83. Thus, as illustrated in FIGURE 2, the control material could be of lead and the gate material could be of tin, or the control of tin and the gate of indium, etc.

An additional pair of superconducting paths or branches E and F are connected to the gate element of cryotron 62, to form a cryogenic load circuit. Branch F includes a cryotron 82 and a cryogenic load 86. Gate element 83 may be formed from tin and control 84 from niobium.

The metals used in the cryotrons are chosen to have the characteristics shown in FIGURE 2 wherein curves N, L, and T represent the characteristics of niobium, lead and tin, respectively.

Typical control characteristics for various crossed films are illustrated in FIGURE 3. Curve G represents the characteristic of crossed films 63–64 and curve H represents the characteristics of crossed films 23–24, 33–34, 43–44, 53–54, and 83–84.

Turning now to the operation of the cryogenic comparator shown in FIGURE 1, with a zero input signal from source 10 applied to terminals 1 and 2, thin film controls 43–44 and 53–54 control superconducting path D while controls 33–34, 23–24, 63–64 control superconducting paths B, C, and E. Films 83–84 control path F. Since the metals are chosen to have the characteristics shown in FIGURE 2, films 24, 34, 44, 54, 64 and 84 remain superconducting while the respective films 23, 33, 43, 53, 63 and 83 are in the normal state. The geometry of the junctions is adjusted to give the control characteristics shown in FIGURE 3. The reset pulse from source 20 is initially applied to control 53–54, 23–24, and 83–84, and then removed. During the time the reset pulse is applied, branches B, D and F are placed in the normal (high resistance) state.

The reset pulse causes a current greater than $I_s$ (reset current) to flow in 24, 54, and 84 so that branches B, D, and F are placed in the normal (high resistance) state during the time the reset pulse is applied (see FIGURE 3). All other branches remain in the superconducting state. This forces the reference current $I_r$ from source 30 to flow through branch C and current $I_f$ to flow in branch E. These reference currents continue to flow through branches C and E after removal of the reset pulse. Now assume a signal is applied to terminals 1 and 2. For other than monotonically increasing functions it will be required that the signal have only one value (amplitude) between reset pulses. Hence the signal must be sampled and held with a sampling rate W and the cryogenic circuit must be reset after each sample. Again referring to FIGURES 1 and 3 it is seen that when the signal reaches a value $E_{1c}$, current $I_1$ reaches a value $I_{1c}$, and path C is placed in the normal state. This forces $I_R$ to divide into branches B and D. The ratio of currents in these branches is controlled by the inductances of the branches so that the current in branch D is:

$$I_D=I_R\frac{L_B}{L_D+L_B}$$

Now for simplicity, assume the geometry of junction 33–34 is the same as the geometry of junction 43–44, so that the control characteristics of FIGURE 3 applies to both junctions. The reduced current $I_D$ through branch D is such that a current $I_2=I_{2c}$ is required to place branch D in the normal state, with $$I_{1c}=\frac{E_{1c}}{R_1}$$

and $$I_{2c}=\frac{E_{2c}}{R_2}$$

$R_1$ and $R_2$ can be chosen so that a current flows in branch D if and only if, $$E_{1c}<E_{in}<E_{2c}$$

(This statement is true provided that only one sample of the input signal is presented between reset pulses.)

In practice, junction 43–44 and 33–34 can have different control characteristics and the circuit parameters can be juggled so that the desired $E_{2c}$ and $E_{1c}$ are obtained.

As explained above current flows in branch D when $E_{1c}<E_{in}<E_{2c}$. If $E_{in}$ is greater than $E_{2c}$, current flows through branch B, and if $E_{in}<E_{1c}$, current flows through branch C. In order to obtain an output when $$E_{1c}<E_{in}<E_{2c}$$

junction 63–64 is arranged to have a characteristic such that current $I_D$ places branch E in the normal state, shunting current through branch F to the cryogenic load. The control characteristic of the junction 63–64 is chosen as shown in FIGURE 3. These characteristics must be such that path E is in the normal state when current $I_D$ flows through path D. This means that $I_F$ must exceed $I_{Fmin}$. It is noted that the control characteristic for 63–64 falls below that for 43–44 and 33–34.

A cryogenic analog to digital converter according to the invention is illustrated in FIGURE 4 and uses the cryogenic comparator shown in FIGURE 1 to convert an analog input signal into a two level digital code. The converter, in the embodiment disclosed, is in three sections 110, 120, and 130 for providing a three digit binary output. Section 110 consist of comparators 111, 112, 113, and 114 having their output circuits connected to a single load 115. Also included in the output circuit is a reset cryotron 82*a*. Digit $D_2$ is taken across load 115. Sections 120 and 130 are similar to section 110 except that they consist of two and one comparator units, respectively.

The reference current and control characteristics for each comparator are adjusted to obtain the desired comparison level. The comparators are adjusted to exhibit resistance between their Y–Z terminals if the input signal lies within the range indicated in Table I.

TABLE I

| Comparator: | Voltage level |
|---|---|
| 111 | $\frac{E}{15}<E_{in}<\frac{3}{15}E$ |
| 112 | $\frac{5}{15}E<E_{in}<\frac{7}{15}E$ |
| 113 | $\frac{9}{15}E<E_{in}<\frac{11}{15}E$ |
| 114 | $\frac{13}{15}E<E_{in}<E$ |
| 121 | $\frac{3}{15}E<E_{in}<\frac{7}{15}E$ |
| 122 | $\frac{11}{15}E<E_{in}<E$ |
| 131 | $\frac{7}{15}E<E_{in}<E$ |

The output of the converter is in parallel form and may be in any desired digital code. The converter accepts the input signal to determine which of *r* levels the input lies between, where $$r=2^n$$

and *n* is the number of binary digits. When it has been determined that the signal lies in an interval between two particular levels, the digital code corresponding to this interval is given at the output. For example, if a three digit code is used there are eight possible outputs. For a natural binary output the code would appear as shown in Table II, assuming an input analog signal, $E_{in}$ varying between 0 and E volts.

TABLE II

| Voltage Level | $D_3$ | $D_2$ | $D_1$ |
|---|---|---|---|
| $0<E_{in}<\frac{1}{15}E$ | 0 | 0 | 0 |
| $\frac{1}{15}E<E_{in}<\frac{3}{15}E$ | 0 | 0 | 1 |
| $\frac{3}{15}E<E_{in}<\frac{7}{15}E$ | 0 | 1 | 0 |
| $\frac{5}{15}E<E_{in}<\frac{7}{15}E$ | 0 | 1 | 1 |
| $\frac{7}{15}E<E_{in}<\frac{9}{15}E$ | 1 | 0 | 0 |
| $\frac{9}{15}E<E_{in}<\frac{11}{15}E$ | 1 | 0 | 1 |
| $\frac{11}{15}E<E_{in}<\frac{13}{15}E$ | 1 | 1 | 0 |
| $\frac{13}{15}E<E_{in}<E$ | 1 | 1 | 1 |

If an analog input signal is applied to terminals 1 and 2 and if the input lies between $E_{1c}$ and $E_{2c}$ normal resistance appears between terminals Y and Z. Paths E and F are superconducting, and the introduction of resistance in path E causes current to be shunted into path F and the superconducting load 115. The outputs from comparators 111–114 are combined in series, as are those of comparators 121 and 122, to give the binary code of Table II. Thus if the signal level lies between $$\frac{9}{15}E \text{ and } \frac{11}{15}E$$

comparators 113 and 131 exhibit resistance between their Y–Z terminals and current is shunted into loads 115 and 135 indicating a "1" for digits $D_1$ and $D_3$. The current through load 125 remains zero indicating a "zero" for digit $D_2$. Thus, the binary output of the device is 101.

Figure 5A:
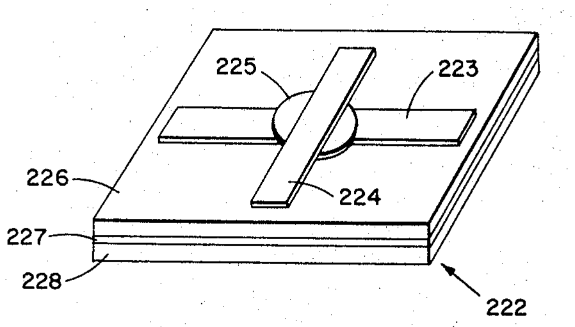
Figure 5B:
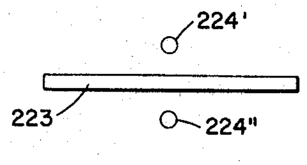

Details of the thin film cryogenic controls for the comparator circuits are shown in FIGURE 5*a*. Cryotron 222 comprises a gate element 223 which is mounted above and normal to control element 224. The control element is separated from the gate element by insulation 225. The gate element is mounted upon a sheet of insulation 226 which is in turn mounted upon a superconducting ground plane 227. The ground plane is secured to a glass substrate 228 and is made of a material which remains superconducting throughout the operation of the system. A second embodiment of the cryotron is illustrated in FIGURE 5*b* and comprised a gate element 223' and two control wires 224' and 224''. The control wires are disposed on opposite sides of the gate and are connected to the current source so that the currents therein flow in opposite directions.

Observations have shown that crossed thin films constructed with a superconducting ground plane such as that illustrated in FIGURE 5*a* have a resistance characteristic "K" as shown by FIGURE 6. The same effect can be obtained by the arrangement in FIGURE 5*b* where the control currents are in opposite directions. In both devices the normal field acting on the gate is cancelled and only a tangential field is effective. If the ground plane is removed, the resistance characteristic is as shown by curve L in FIGURE 6. It is clear that in applying the cryotron to the comparator circuit the ground plane or two wire system should be used so as to obtain a small threshold at the input to the comparator. The use of the ground plane also reduces the inductance of the gate by several orders of magnitude so that the switching time of the device is greatly reduced.

While this invention has been described with reference to specific embodiments thereof, it will be appreciated that many modifications and changes may be made by those skilled in the art without departing from the spirit of the invention, as defined in the appended claims.

We claim:

1. A cryogenic analog to digital converter comprising: a plurality of binary digit forming units wherein each digit forming unit is separate and distinct from each other digit forming unit and operates independently therefrom; said units each including at least one cryogenic comparator; an input signal source connected to each of said comparators; an output means in each comparator, each of said output means connected in series with each other output means in the same unit; a load circuit in each unit, series connected with said output means; and a reset circuit, separate and distinct from said input signal source connected in each of said load circuits.

2. A cryogenic analog to digital converter comprising: a plurality of binary digit forming units; said units each including at least one cryogenic comparator, wherein each comparator comprises a plurality of parallel connected superconducting branches and at least one cryogenic control device in each of said superconducting branches for controlling current flow therethrough; an input signal source connected to each of said comparators; an output means in each comparator, each of said output means connected in series with each other output means in the same unit; a load circuit in each unit connected in series with said output means; and a reset circuit connected in each of said load circuits.

3. A device as set forth in claim 2 wherein each of said cryogenic control device comprises a gate member of superconducting material, a control member of superconducting material transversely crossing said gate member, a ground plane member disposed adjacent said gate and control member and an insulating member disposed between said gate member and said ground plane member.

4. A device as set forth in claim 2 wherein each of said cryogenic control devices comprises a gate member of superconducting material, a first control member of superconducting material transversely crossing said gate member, and a second control member of superconducting material transversely crossing said gate member, said first and second control members being disposed on opposite sides of said gate member and adapted for current flow therethrough in opposite directions.

5. A cryogenic analog to digital converter for converting an analog input signal into a three digit code, comprising: first, second and third digit forming units, each operating independently from the others; said first digit forming unit including first, second, third and fourth cryogenic comparators, said comparators including series connected ouput means, a first load circuit connected in series with said series connected output means, and a first reset device connected in said first load circuit; said second digit forming unit including fifth and sixth cryogenic comparators having series connected output means, a second load circuit connected in series with said fifth and sixth output means, and a second reset device connected in said second load circuit; said third digit forming unit including a seventh cryogenic comparator having output means, a third load circuit connected in series with said seventh output means, and a third reset device connected in said third load circuit; an analog input signal source connected to each of said comparators; and a reset current source connected to each of said reset devices.

6. A cryogenic analog to digital converter for converting an anolg input signal into a three digit code, comprising: a first digit forming unit including first, second, third and fourth cryogenic comparators, said comparators including series connected output means, a first load circuit connected in series with said series connected output means, and a first reset device connected in said first load circuits; a second digit forming unit including fifth and sixth cryogenic comparators having series connected output means, a second load circuit connected in series with said fifth and sixth output means, and a second reset device connected in said second load circuit; a third digit forming unit including a seventh cryogenic comparator having output means, a third load circuit connected in series with said seventh output means, and a third reset device connected in said third load circuit; an analog input signal source connected to each of said comparators; a reset current source connected to each of said reset devices; and wherein each of said comparators comprises a plurality of parallel connected superconducting branches, and at least one cryogenic control device in each of said superconducting paths for controlling current flow therethrough.

7. A device as set forth in claim 6 wherein each of said reset devices is a cryogenic control device having a control element and a gate element.

8. A device as set forth in claim 6 wherein each of said comparators comprises first, second and third parallel connected superconducting branches, said first branch including a first cryogenic control device connected to said reset current source, said second branch including a second cryogenic control device connected to said input signal source, and said third branch including third and fourth cryogenic control devices and said output means, said third and fourth control devices being connected to said input and reset sources, respectively.

9. A device as set forth in claim 8 wherein said output means is a cryogenic control device having a control element and a gate element.

References Cited

UNITED STATES PATENTS

| | | | |
|---|---|---|---|
| 2,949,602 | 8/1960 | Crowe | 340—347 |
| 3,050,721 | 8/1962 | Anderson | 340—347 |
| 3,168,727 | 2/1965 | Schmidlin et al. | 340—173.1 |
| 3,181,126 | 4/1965 | Green | 340—173.1 |
| 3,191,063 | 6/1965 | Ahrons | 340—173.1 |
| 3,196,427 | 7/1965 | Mann et al. | 340—347 |
| 3,259,887 | 7/1966 | Garwin | 340—173.1 |

OTHER REFERENCES

Analog to Digital Conversion Using Cryotrons by W. G. Strohm; IBM Technical Disclosure Bulletin, vol. 3, No. 4, September 1960, pp. 64–65.

MAYNARD R. WILBUR, *Primary Examiner.*

W. J. KOPACZ, *Assistant Examiner.*